Nov. 15, 1960 F. ZANKL 2,959,976
BACKLASH ELIMINATOR
Filed May 19, 1958 2 Sheets-Sheet 1

INVENTOR.
Frank Zankl
BY
Attorney

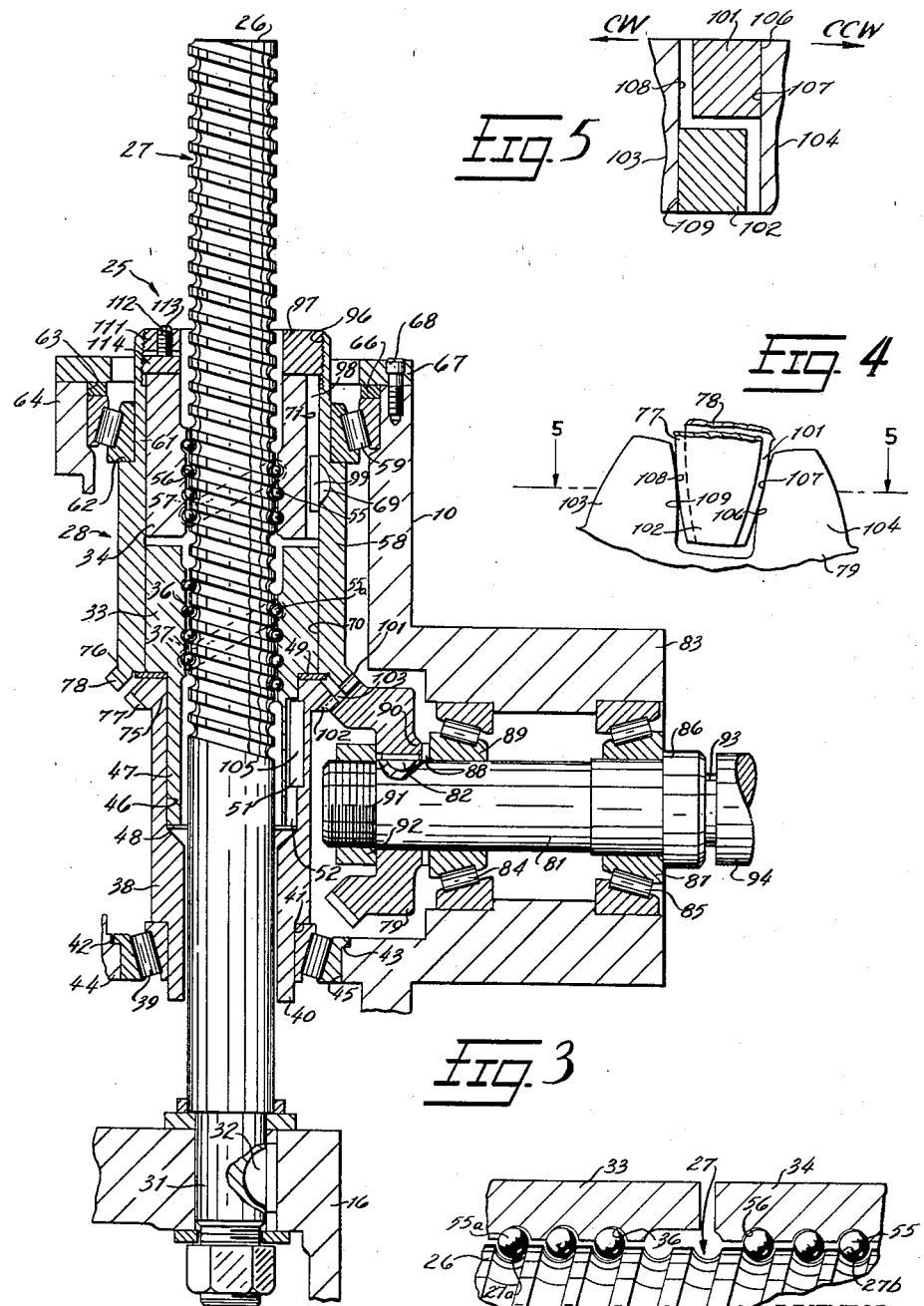
Nov. 15, 1960  F. ZANKL  2,959,976
BACKLASH ELIMINATOR
Filed May 19, 1958  2 Sheets-Sheet 2
INVENTOR.
Frank Zankl
BY
Elroy J. Wutschel
Attorney United States Patent Office 2,959,976
Patented Nov. 15, 1960

2,959,976
BACKLASH ELIMINATOR

Frank Zankl, Milwaukee, Wis., assignor to Kearny & Trecker Corporation, West Allis, Wis., a corporation of Wisconsin Filed May 19, 1958, Ser. No. 736,064

10 Claims. (Cl. 74—441)

This invention relates generally to an improved screw and nut driving mechanism for a machine tool, and more particularly to an improved dual backlash compensator and driving apparatus for a screw and nut actuating mechanism which is particularly suitable for use with antifriction type screw and nut actuating mechanisms.

In screw and nut actuating mechanisms employed to actuate members requiring extreme accuracy of movement, the screw and nut mechanisms have been of the antifriction type. In an antifriction type screw and nut mechanism, a screw provided with a continuous helical ball receiving groove is operatively engaged by a plurality of bearing balls that are constrained for continuous recirculating movement within a cooperating nut presenting a complementary internal helical ball receiving groove having its opposite ends connected by a return tube. The internal groove of the nut and a portion of the helical groove of the screw cooperate with the return tube of the nut to provide a continuous pathway permitting continuous recirculating movement of the antifriction bearing balls to minimize friction as the screw and nut are relatively rotated. In those conditions of operation requiring extreme accuracy with a minimum of axial backlash of the screw relative to the nut, it has been necessary to employ the highest standards of accuracy during manufacture and assembly. In spite of these precautions, however, it is virtually impossible to remove all of the backlash between the screw and nut. In addition to this, no provision is made to eliminate lost motion in the drive connection to the rotatable nut elements of the screw and nut mechanism.

The primary object of the present invention is to provide means for removing backlash in a screw and nut actuating mechanism.

Another object of the present invention is to provide improved means for compensating for backlash in an antifriction screw and nut mechanism of the recirculating ball type.

Another object of the present invention is to provide means for removing backlash in an antifriction screw and nut mechanism of the recirculating ball type that will not interfere with the antifriction action of the ball recirculating type screw and nut mechanism.

Still another object of the present invention is to provide an improved dual backlash eliminator which is operable to eliminate lash in the screw and also to eliminate lost motion in the driving connection to the rotatable nut elements of the screw and nut mechanism.

Still another object of the present invention is to provide a screw and nut actuating mechanism having a single adjusting means for eliminating lash in the screw and lost motion in the driving connection to the nut element of the screw and nut mechanism.

According to this invention there is provided an improved dual backlash eliminator which may be adapted to a rotatable nut of a screw and nut mechanism. The nut of the dual backlash eliminator comprises two elements in threaded engagement with the screw. A first driving sleeve is mounted about the screw and receives an extending portion of one of the nut elements in a manner to establish a driving connection from the sleeve to the nut element. A second driving sleeve is mounted about the screw and receives the second nut element in a manner that the second nut element is movable axially relative to the second driving sleeve but providing for a driving connection between the second driving sleeve and the second nut element. The second nut element may be rotated slightly along the screw and locked in a fixed axial and angular position relative to the first nut element. Axial adjustment of the second nut element operates to remove lash between the rotatable nut elements and the screw. To drive the nut elements, the two driving sleeves are provided with bevel gear portions that are in meshing engagement with a bevel gear drive mechanism. Angular adjustment of the second nut element relative to the screw serves to eliminate lash between the two gear portions of the driving sleeves and the cooperating driving bevel gear.

The foregoing and other objects of this invention, which will become more fully apparent from the following detailed specification, may be achieved by the particular structure constituting an exemplifying embodiment of the invention that is depicted in and described in connection with the accompanying drawing, in which:

Fig. 3 is an enlarged fragmentary view in vertical section illustrating the antifriction screw and nut mechanism of Fig. 2;

Fig. 4 is an enlarged fragmentary view in side elevation of the bevel gears of the driving sleeves and the bevel drive gear showing the position of a tooth of each of the split bevel gears relative to the teeth on the driving bevel gear;

Figures 1, 2:
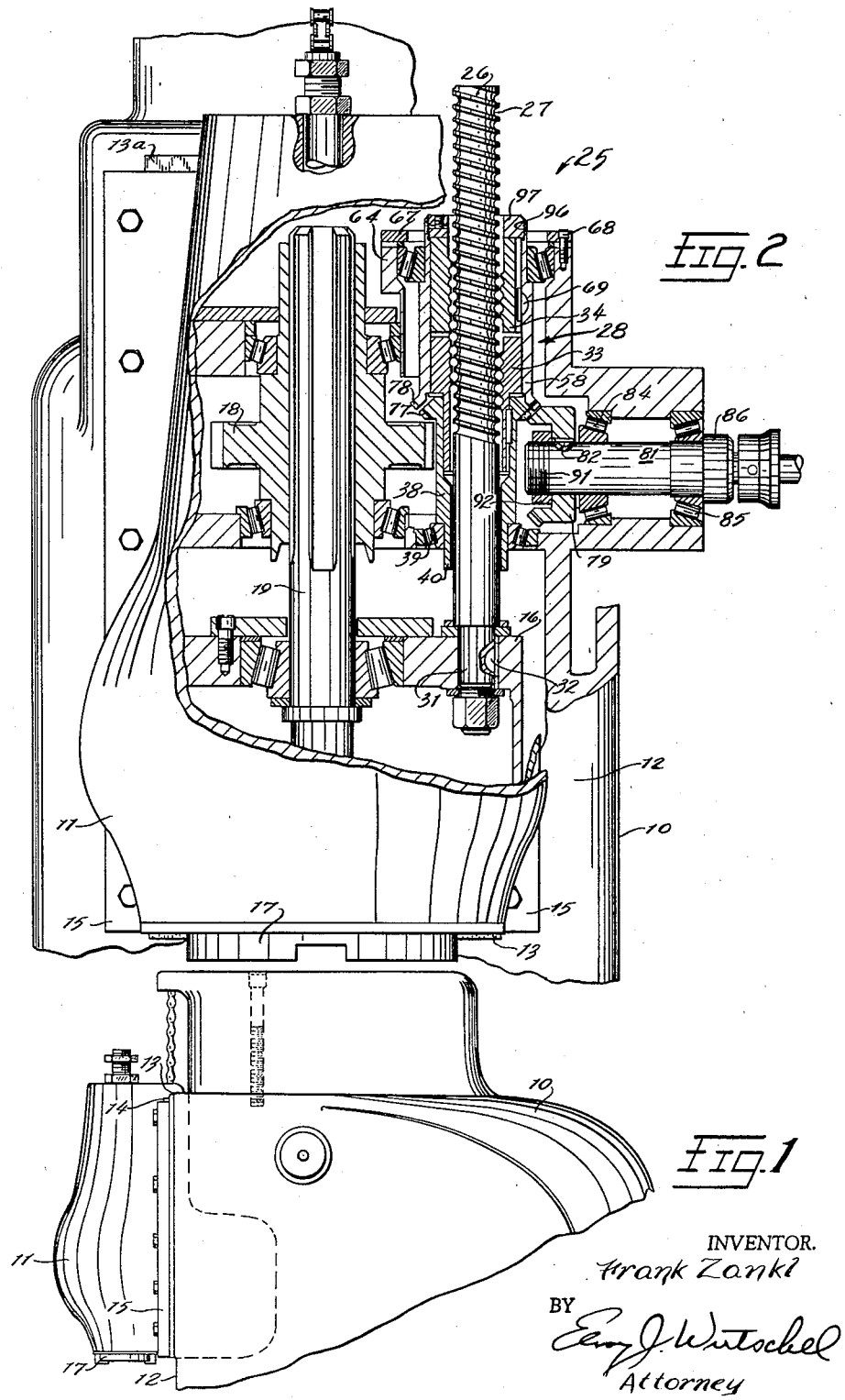
Figure 1 is a view in side elevation of the upper portion of a milling machine showing the upper portion of the column on which is supported for vertical movement a spindle head and in which the present invention has been incorporated.
Fig. 2 is an enlarged fragmentary view in front elevation having parts broken away to show the various internal operating parts and showing the dual backlash compensating arrangement for the antifriction screw and nut mechanism for actuating the spindle head on the column.

Fig. 5 is an enlarged fragmentary sectional view of the gear sections of the nut elements in meshing engagement with the bevel drive gear, taken generally along the line 5—5 in Fig. 4, and showing the relationship of a tooth element of the gear section of the nut element in relation to a pair of adjacent tooth elements of the driving bevel gear; and, Fig. 6 is an enlarged fragmentary view in vertical longitudinal section through the backlash compensator, showing the position of the bearing balls relative to the nut elements and the screw after adjustment.

The mechanism shown in Fig. 1, is illustrative of apparatus incorporating the features of the invention, and constitutes a portion of a milling machine, which may be of any suitable construction and is here represented by the upper portion of a column 10 on which a spindle head 11 is movably supported. The spindle head 11 is supported for vertical movement on a front face 12 of the column 10. The front face 12 of the column 10 is provided with way surfaces 13 and 13a which are engaged by complementary way surfaces 14 on the spindle head 11 to provide for sliding vertical movement of the head 11 on the column. The spindle head 11 is slidably maintained in position on the column 10 by means of a pair of retainer plates 15 suitably secured, as by screws, to the column 10. The spindle head 11 is provided with a rearwardly extending projection 16 which extends inwardly into the column 10 through a suitable vertical opening (not shown) provided in the front face 12 of the column between the way surfaces 13 and 13a.

As previously mentioned, the head 11 rotatably supports a spindle 17 which is operably connected to be driven by a source of power (not shown) contained within the column and operably connected through a gear transmission (not shown), in a well known manner, to drive a spur gear 18 rotatably supported in the upper portion of the column 10. The spur gear 18 is provided with an axial bore through which an axially movable drive shaft 19 extends. A driving connection between the gear 18 and the shaft 19 is established by means of a splined connection, which permits of axial movement of the shaft 19 while maintaining a driving connection between the members. The shaft 19 is rotatably supported by the projecting portion 16 of the head 11, in a well known manner, to provide for movement of the shaft 19 with the head 11 while maintaining a driving connection with the gear 18. The shaft 19 is provided at its lower end with another gear (not shown) which is secured to it for rotation with it, and which in turn is disposed in meshing engagement with a spindle gear (not shown) operably connected to effect rotation of the spindle 17.

Vertical movement of the spindle head 11 is effected by means of a ball bearing nut and screw actuating mechanism, generally denoted by the reference numeral 25 in Figs. 2 and 3, and operatively connected between the column 10 and the spindle head 11. The nut and screw mechanism 25 comprises a rotatable feed screw 26 provided with a helically formed semicircular groove generally denoted by the numeral 27 constituting a ball race that is adapted to cooperate with an adjustable ball bearing nut mechanism 28. Although the illustrative embodiment depicts the features of the present invention operating in conjunction with a screw and nut mechanism having a recirculating ball bearing race since the latter construction is particularly well adapted to function with the structure of the present invention, the invention is likewise adapted to be utilized in conjunction with a conventionally threaded screw and nut mechanism if the pitch of the thread is adapted to render the mechanism reversible in that the input may be applied to either the nut or the screw without causing it to lock.

The screw 26, as shown in Figs. 2 and 3, is vertically supported in the column 10 for axial movement and has its lower end 31, secured to the head projection 16. The screw 26 is prevented from rotating relative to the spindle head 11 by means of a key 32. Thus, by reason of its connection to the projection 16, axial movement of the screw 26 in the required direction operates to effect vertical movement of the spindle head 11 in a selected direction on the column 10.

To obviate axial backlash in the screw 26, as shown in Figs. 2 and 3, the cooperating ball bearing nut mechanism 28 includes a rotatable axially stationary nut element 33 and a rotatable axially adjustable nut element 34. The nut elements 33 and 34 are disposed in spaced apart relationship on the screw 26. Simultaneous rotation of the nut elements 33 and 34 operates to effect axial movement of the screw 26, while axial adjustment of the nut element 34 on the screw 26 relative to the nut element 33 operates to eliminate the axial backlash between the nut elements and the screw 26.

As shown in Figs. 2, 3 and 6, the ball bearing nut element 33 is provided with an internal helical groove 36 of semicircular cross section complementary to the helical groove portion 27a formed on the screw 26 and that is likewise disposed to constitute a ball race, which grooves cooperate to constitute an enclosed ball race for receiving a plurality of antifriction bearing balls 55a that form the medium of engagement therebetween, in a well known manner. A return ball pathway 37 is provided in the nut element 33 for permitting a continuous recirculating movement of the bearing balls 55a.

To effect a drive to the nut element 33 an elongated driving sleeve 38 is mounted about the screw 26 and is rotatably supported in an antifriction thrust bearing 39. The inner race of the thrust bearing 39 is seated on a reduced portion 40 of the sleeve 38 and abuts a shoulder 41 which is formed in providing the reduced portion 40 on the sleeve. The outer race of thrust bearing 39 is disposed within a bore 45 formed within the web 44 and is provided with an annular flange 42 which is received in a counterbore 43.

The driving sleeve 38 is provided with an enlarged bore 46 which receives a tubular extension 47 of the nut element 33. The lower end of the tubular nut extension abuts a thrust washer 48 inserted into the bottom of the bore 46, while the upper end of the driving sleeve engages a thrust washer 49 mounted on the tubular extension 47 of the nut element 33 and bearing against the shoulder formed by the body of the nut element 33 and the extension 47. Thus, axial movement of the nut element 33 in a downward direction, as viewed in Fig. 3, is effectively prevented by the cooperative action of the web 44, the thrust bearing 39, the driving sleeve 38, and the thrust washers 48 and 49. A driving connection between the driving sleeve 38 and the nut element 33 is established by means of a key 51 carried within a suitable recess provided in the wall of the bore 46 of the sleeve 38. The key 51 extends into a keyway 52 provided in the exterior surface of the tubular extension 47 of the nut element 33. It is apparent that a rotational drive will be transmitted from the driving sleeve 38 to the nut element 33 by means of the key 51. With the structure of the present invention it is not necessary to effect a precision fit of the key 51 within the keyway 52, since there will be only a one way force exerted upon the key 51, as will be more fully described.

The ball bearing nut element 34 is provided with an internal helical groove 56 of semicircular cross section complementary to the helical groove portion 27b formed on the screw 26 and that is likewise disposed to constitute a ball race which cooperates with the groove 27b to constitute an enclosed ball race for receiving a plurality of antifriction bearing balls 55, shown in Fig. 6, that form the medium of engagement between the nut element 34 and the screw 26, in a well known manner. A return ball pathway 57 is, likewise, provided in the nut element 34 for permitting a continuous recirculating movement of the bearing balls 55.

To effect a drive to the nut element 34 an elongated driving sleeve 58 is mounted about the nut elements 33 and 34 and is rotatably supported in an antifriction thrust bearing 59. The inner race of the thrust bearing 59 is seated on a reduced portion 61 of the driving sleeve 58 and abuts a shoulder 62 formed by the reduced portion 61 and the body of the driving sleeve 58. The outer race of the thrust bearing 59 is housed within a counterbore 63 formed in a tubular vertically disposed housing or sleeve 64 provided in the column 10. A retaining spacer 66 is inserted within the counter bore 63 into engagement with the outer race of the thrust bearing 59 to maintain the thrust bearing 59 in position within the counter bore 63. A bored retainer plate 67 is provided to maintain the assembly in position and is secured to the housing 64 by cap screws 68 with the lower end of the driving sleeve 58 engaging against the thrust washer 49. Thus, the assembly of the driving sleeve 38 and the driving sleeve 58 is prevented from moving axially in either direction by the cooperating parts comprising the web 44, the antifriction thrust bearing 39, the driving sleeve 38, the thrust washer 49, the driving sleeve 58, the antifriction thrust bearing 59, the retaining spacer 66 and the retainer plate 67. The bore 70 of the driving sleeve 58 is of a diameter to accommodate the bodies of the nut elements 33 and 34 in a manner to permit of rotational movement of the nut element 33 therein and to permit the nut element 34 to move axially therein.

A driving connection between the driving sleeve 58 and the nut element 34 is established by means of a key 69 carried within a suitable recess provided in the wall of the bore 70 of the driving sleeve 58. The key 69 extends into a keyway 71 provided in the external surface of the body of the nut element 34. Likewise, it is not necessary to effect a precision fit of the key 69 within the keyway 71, since there will be only a one way force exerted upon the key 69, as is the case with the key 51 of the driving sleeve 38.

The adjacent ends 75 and 76 of the driving sleeves 38 and 58, respectively, are provided with bevel gears 77 and 78, which in effect are two sections of a single gear, since the gears 77 and 78 are mitered at the same time, during initial assembly. Both gears 77 and 78 are in unitary meshing engagement with an input bevel gear 79 mounted on the inner end of an input shaft 81, the two gears 77 and 78 functioning as a single bevel gear in engagement with the bevel gear 79 but split into two annular sections. The input gear 79 is connected to the shaft 81 for rotation with it by means of a key 82. The input shaft 81 is rotatably supported in a bored boss 83 in a pair of antifriction bearings 84 and 85 which are mounted in suitable counterbores provided in the boss 83. A collar 86 provided on the outwardly extending end of the shaft 81 is disposed in engagement with the inner race 87 of the bearing 85 and serves to maintain the bearing in position in the boss 83.

In order to maintain the bearing 84 in position in the boss 83, a spacer 88 is mounted on the shaft 81 to engage against the inner race 89 of the bearing 84. The bevel input gear 79 is provided with a hub 90 which abuts the spacer 88 to permit the gear 79 to rotate freely with the shaft 81 while maintaining the spacer 88 in position against the inner race of the bearing 84. The extreme inner end 91 of the shaft 81 is provided with a threaded portion which threadedly receives a locking nut 92 and which operates to maintain and lock the drive shaft assembly in position within the boss 83. The outer end 93 of the drive shaft 81 is connected by means of a suitable coupling 94 to a source of power (not shown) which operates to drive the shaft 81 in either direction of rotation. As previously mentioned, the gears 77 and 78 are mitered simultaneously at the time of initial assembly along with the bevel input gear 79. Thus, the mitering distance for the gears 77, 78 and 79 are established at the same time.

To eliminate backlash between the screw 26 and the nut mechanism 28, the adjustable nut element 34 is adapted to be adjusted axially on the screw 26 relative to the nut element 33. To this end, the driving sleeve 58 is provided with a threaded bore 96 of a depth sufficient to permit the outer end of the nut element 34 to extend therein. An adjusting plug 97 having a peripheral thread provided thereon, is mounted about the screw 26 and is threadedly engaged with the threaded bore 96 into engagement with the outer end of the nut element 34 that extends within the bore 96. Thus, the adjusting plug 97 will function to prevent axial movement of the nut element 34 upwardly, as viewed in Figs. 2 and 3. To eliminate lash between the screw 26 and the nut mechanism 28, the adjusting plug 97 is threaded inwardly into the bore 96 to exert an axial force downwardly, as viewed in Figs. 2 and 3, against the nut element 34, moving the nut element 34 toward the nut element 33.

The adjusting plug 97 when threaded inwardly into the bore 96 will exert an axial force on the end of the nut element 34 moving it relative to the screw 26 downwardly toward the nut element 33, as viewed in Figs. 2 and 3. The nut element 34 moving downwardly relative to the screw 26 operates to exert outwardly opposed axial forces against the opposite faces of spaced apart portions of the helical ball race 27 formed in the screw 26. With the adjusting plug 97 engaged to eliminate backlash, as shown in Fig. 6, the recirculating bearing balls 55 are urged into engagement between the leftward circular face of groove portion 27b of the screw 26 and the rightward or outer face of the associated helical race 56 formed in the nut element 34. This action tends to move the screw 26 axially downwardly as viewed in Figs. 1 and 2 or leftwardly as viewed in Fig. 6. The screw 26 on moving axially downwardly urges the bearing balls 55a into engagement with the rightward face of a spaced apart portion of the race 27a and the leftward or outer face of the helical groove 36 formed in the nut element 33. Thus, the two sets of antifriction balls 55 and 55a are retained in any predetermined degree of tightness between the helical race 27 of the screw and the cooperating helical races 56 and 36 to completely eliminate backlash therebetween.

When the nut element 34 has been adjusted to remove lash between the screw 26 and the nut mechanism 28, a slight additional rotation of the adjusting nut 97 will tend to effect angular movement of the plug element 34 on the screw 26 in a clockwise direction, as viewed from the top in Fig. 3. Clockwise rotation of the nut element 34 will operate to forcefully engage the face 98 of the keyway 71 with the key 69 in a clockwise direction, as viewed from the top in Fig. 3. The force exerted by the nut element 34 on the key 69 will be transmitted by the key 69 to the driving sleeve 58 causing it to rotate in a clockwise direction, as viewed from the top in Fig. 3, thereby positively engaging a face 106 of a tooth 101 of the gear 78 with a face 107 of a tooth 104 of the input gear 79, as shown in greatly exaggerated detail in Figs. 4 and 5.

It is to be noted that when the adjustment of the nut element 34 relative to the drive sleeve 58 has been established the key 69 will be firmly and positively engaged with the face 98 of the keyway 71 and maintained in that condition thereafter. Thus, the relative loose fit of the key 69 within the keyway 71 has been compensated for and the possibility of lost motion between the nut element 34 and the driving sleeve 58 is eliminated. The forceful engagement of the teeth 101 and 104 will operate to rotate the input gear 79 in a counterclockwise direction, as viewed from the right in Fig. 2. Therefore, a face 108 of a gear tooth 103 of the input gear 79 will be moved into positive engagement with a face 109 of a gear tooth 102 of the gear 77. Thus, the gear teeth 101 and 102 of the gears 78 and 77, respectively, will be offset relative to each other and each tooth will be in positive engagement with the adjacent teeth 104 and 103 of the gear 79. It is apparent, therefore, that rotation of the bevel gear 79 in either direction of rotation will immediately transmit a driving force to either of the driving sleeves 38 or 58, depending upon the direction of rotation of the input gear 79. The rotational motion imparted to the input gear 79 by reason of the positive engagement of the teeth 102 and 103 of the gears 77 and 79, respectively, will tend to rotate the gear 77 and thereby the sleeve 38 in a clockwise direction, as viewed from the top in Fig. 3.

Rotation of the driving sleeve 38 in a clockwise direction, as viewed from the top in Fig. 3, will effect positive engagement of face 105 of the key 51 with the side wall (not shown) of the keyway 52 thereby applying a force in the opposite direction on the key 51. Since the key 51 is firmly and positively engaged with the face or side wall of the keyway 52 any play that may have existed between the key 51 and the faces of the keyway has also been compensated for and the possibility of lost motion between the driving sleeve 38 and the nut element 33 eliminated. The rotational drive imparted by the input gear 79 to the driving sleeve 38 as transmitted by the key 51 will operate to effect rotation of the nut element 33 in a clockwise direction, as viewed from the top of Fig. 3.

With all backlash between the elements of the mechanism thus eliminated the elements may be locked in the adjusted position. To this end, the adjusting plug 97 has been constructed as a split plug. The outer portion 111 of the plug 97 is provided with a threaded opening 112 which threadedly receives a set screw 113. The set screw 113 upon being threaded inwardly into the portion 111 forcefully contacts the surface of a portion 114 of the plug 97. The set screw 113 thereby operates to urge the portion 111 upwardly and also acts on the portion 114 to urge it downwardly to effect tight frictional engagement of the peripheral threads on the portions 111 and 114 with the thread provided in the bore 96 to effectively maintain the elements of the mechanism in the adjusted position.

Thus, the nut element 34 is adjusted axially downwardly relative to the screw 26 and toward the nut element 33 as viewed in Fig. 3, or leftwardly as viewed in Fig. 6, through the operation of the adjusting plug 97. The movement of the nut element 34 leftwardly operates to forcefully engage the bearing balls 55 with the leftward side of the groove portion 27b of the helical groove 27 of the screw 26 forcing the screw 26 leftwardly, as viewed in Fig. 6. The screw 26 upon being forcefully moved leftwardly operates to engage the rightward circular face of the groove portion 27a of the helical groove 27 with the bearing balls 55a forcing them into engagement with the leftward or outer face of the helical groove 36 in the nut element 33. Since the nut element 33 cannot move downwardly, as viewed in Fig. 3, by reason of the driving sleeve 38 and bearing 39 acting to prevent such movement, as previously described, all backlash between the nut elements 33 and 34 and the screw 26 will have been removed and they will then act as a unit. The adjusting plug 97 may then be positively locked in the adjusted position by operating the set screw 113, as described, to maintain the elements of the mechanism in adjusting relationship and acting as a unit.

In operation, keeping in mind that the face opposite of the face 99 of the key 69 is firmly engaged with the face 98 of the keyway 71 and that the face 105 of the key 51 is firmly engaged with the face (not shown) of the keyway 52, as previously described, clockwise rotation of the gear 79, as viewed from the right in Fig. 3, will operate to rotate the drive sleeve 58 in a counterclockwise direction, as viewed from the top in Fig. 3. Since the key 69 is in firm positive engagement with the face 98 of the keyway 71 the counterclockwise rotation of the drive sleeve 58 will be immediately imparted to the nut element 34 rotating it in a counterclockwise direction, as viewed from the top in Fig. 3, to thereby effect upward movement of the screw 26. During this operation the nut element 33 will follow the nut element 34, since the nut elements now act as a unit, maintaining its adjusted position relative to it. The nut element 33 in following the rotational movement of the nut element 34 will maintain a firm engagement with the surface 105 of the key 51 thereby maintaining the surface 109 of the tooth 102 of the gear 77 in firm engagement with the face 108 of the tooth 103 of the input gear 79. This action then maintains the face 109 of the tooth 102 of the gear 77 in engagement with the face 108 of the tooth 103 of the input gear 79. Therefore, a counterclockwise torque applied to the drive shaft 81, as viewed from the right in Fig. 3, will operate to rotate the input gear 79 in a counterclockwise direction.

Since the teeth of the gears 79 and 77 are in positive meshing engagement the counterclockwise rotation of the gear 79 will immediately operate to rotate the gear 77 and thereby the drive sleeve 38 in a clockwise direction, as viewed from the top in Fig. 3. With the key 51 adjusted and maintained in engagement with the side wall (not shown) of the keyway 52 the rotational drive of the drive sleeve 38 in the clockwise direction will be immediately imparted to the nut element 33 to rotate it in a clockwise direction, as viewed from the top in Fig. 3. The clockwise rotation of the nut element 33 operates to effect axial movement of the screw 26 in a downward direction. With the nut element 33 imparting movement to the screw 26 the nut element 34 will follow the rotational movement of the nut element 33 in the clockwise direction and maintain the face of the key 69 in engagement with the side wall 98 of the keyway 71 and the face 106 of the tooth 101 of the gear 78 in firm engagement with the face 107 of the tooth 104 of the input gear 79.

It is therefore apparent that a backlash eliminator has been provided which is operable by a single adjustment of the adjusting plug 97 to eliminate backlash between the screw 26 and nut elements 33 and 34, as well as to eliminate lost motion in the drive connections from the input bevel gear to the nut elements 33 and 34 and also eliminate play between the keys and their respectively associated keyways to provide a transmission train that is completely free of backlash to thereby render it immediately and accurately responsive to the slightest rotational movement of the shaft 81 in either direction.

From the foregoing detailed description of the illustrative structure set forth herein to disclose the principles of the invention, it is apparent that there has been provided an improved dual backlash eliminator adapted to control backlash in a screw and nut mechanism and also in the drive connection to the screw and nut mechanism. While the invention is shown adapted to machine tool elements, it may be adapted to other types of screw and nut mechanisms with equal utility.

Although the invention has been described in considerable detail in order to fully disclose the invention, it is to be understood that the particular apparatus shown and described is intended to be illustrative only and that the various novel features of the invention may be incorporated in other structural forms without departing from the spirit and scope of the invention, as described in the subjoined claims.

The principles of this invention having now been fully explained in connection with the foregoing description, I hereby claim as my invention:

1. In motion transmitting mechanism the combination of a fixed supporting member, a movable member, a screw fixedly attached to one of said members; a pair of axially spaced nut elements rotatably engaged on said screw; a pair of axially spaced fixedly positioned thrust bearings on the other of said members to preclude movement of the first of said nut elements in one direction; a gear drive transmission operably connected to effect rotation of said nut elements to effect axial movement of said screw; and an adjusting plug operably connected to effect axial adjustment of the second of said nut elements toward the first of said nut elements to eliminate backlash between said screw and said nut elements, said adjusting plug being also operable to effect rotation of the axially adjustable nut element on said screw to thereby eliminate lost motion in the gear drive transmission.

2. In a dual backlash eliminator for a screw and nut mechanism; the combination of a fixed supporting member and a movable member; a screw fixedly attached to one of said members; a pair of axially spaced fixedly positioned thrust bearings on the other of said members; a first nut element engaged on said screw for rotation relative to said screw; a second nut element engaged on said screw in axially spaced relationship with said first nut element for rotation relative to said screw and for limited axial movement relative to said screw and toward said first nut element, said pair of axially spaced fixedly positioned thrust bearings serving to preclude movement of said first nut element in one direction, a first gear connected to rotate said first nut element; a second gear connected to rotate said second nut element; an input gear operably connected to rotate said first and second gears simultaneously in the same direction; means to rotate said input gear in either direction of rotation; and an adjusting plug disposed in axial engagement with said second nut and being operable when actuated to effect axial movement of said second nut element relative to said screw and toward said first nut element to eliminate backlash between said screw and said first and second nut elements, said adjusting plug being also operable to effect angular movement of said second nut relative to said screw to thereby eliminate lost motion in the drive connection between said first and second gears and their associated nut elements and between said first and second gears and said input gear, said adjusting plug being further operable to prevent axial movement of said second nut element in a direction opposite to the direction in which said second nut element is axially adjustable.

3. In a screw and nut actuating mechanism; a screw; a first nut element and a second nut element disposed adjacent each other on said screw but spaced apart axially thereon; means to rotate said nut elements simultaneously in the same direction comprising a first axially stationary bevel gear secured to said first nut element in a manner to effect rotation of said nut element; means to prevent axial movement of said first nut element in one direction; a second axially stationary bevel gear connected to rotate said second nut element, the connection between said second bevel gear and said second nut element being such as to permit said second nut element to move axially relative to said screw; an input bevel gear disposed in meshing engagement with said first and second bevel gears and operable when actuated to drive said gears simultaneously in the same direction; and an adjusting member disposed in engagement with said second nut element and operable when actuated to adjust said second nut element axially relative to said screw and toward said first nut element to thereby eliminate backlash between said screw and said nut elements, said adjusting member being also operable when acting upon said second nut element to effect angular movement of said second nut element on said screw to thereby eliminate lost motion in the connection between said second nut element and said second bevel gear which operates to rotate said second bevel gear into positive engagement with an interdental face on said input bevel gear to angularly move said input bevel gear so that the opposite interdental face positively engages said first bevel gear to effect angular movement of said first bevel gear relative to said first nut element.

4. In a machine tool having a supporting member and a member movable on said supporting member; a screw and nut mechanism operably connected to effect movement of the movable member; a screw secured to said movable member against rotation; a first nut element engaged on said screw for rotation relative to said screw but axially stationary relative thereto; a second nut element engaged on said screw for rotational movement relative to said screw, said second nut element being disposed on said screw adjacent to said first nut element but in spaced relationship to said first nut element, said second nut element being also axially movable relative to said screw and said first nut element; a first bevel gear connected to rotate said first nut element; a second bevel gear connected to rotate said second nut element, the rotatable drive connection between said second bevel gear and said second nut element being such as to permit of axial movement of said second nut element relative to said second bevel gear and said screw; a bevel input gear in meshing engagement with said first and second bevel gears; and an axially movable adjusting plug operably connected to exert an axial force on said second nut element to adjust said second nut element relative to said screw and toward said first nut element to thereby eliminate backlash in said screw and nut mechanism, said adjusting plug being further operable to effect angular movement of said second nut element on said screw and thereby rotate said second bevel gear to move said input bevel gear in a manner to move said input bevel gear into positive engagement with said first bevel gear; whereby lost motion in said gear drive connection is removed and backlash in said screw and nut mechanism is eliminated by means of a single adjustment of said adjusting plug.

5. In an anti-backlash screw and nut mechanism; a screw; a first nut element engaged on said screw for rotation relative to said screw; a second nut element engaged on said screw for rotational and axial movement relative to said screw, said second nut element being disposed on said screw in spaced relationship to said first nut element; a first driving sleeve mounted about said screw for free rotational movement, said first driving sleeve being operably connected to drive said first nut element in either direction of rotation, said first driving sleeve being operable to prevent axial movement of said first nut element in one direction; a second driving sleeve mounted about said screw for free rotational movement, said second driving sleeve being operably connected to drive said second nut element in either direction of rotation while permitting of axial movement of said second nut element relative to said screw, said first and second driving sleeves being maintained axially immovable; means to prevent said second nut element from moving axially in a direction opposite to the direction in which said first nut element is axially immovable; a first bevel gear on said first driving sleeve and operably connected to effect rotation of said driving sleeve; a second bevel gear on said second driving sleeve and operably connected to effect rotation of said driving sleeve; a bevel input gear in meshing engagement with said first and second bevel gears on said driving sleeves and operable when actuated to drive said first and second bevel gears simultaneously in the same direction to thereby effect rotation of said first and second nut elements in the same direction to move said screw axially; and an adjusting plug threadedly engaged in said second driving sleeve to rotate with it and disposed in position to be in engagement with said second nut element; whereby rotational adjustment of said adjusting plug will exert an axial force on said second nut element to effect axial adjustment of said second nut element relative to said screw to remove backlash between said nut elements and said screw and will also operate to effect rotational movement of said second nut element thereby rotating said second driving sleeve to effect positive engagement of said second bevel gear with said input bevel gear which in turn insures positive engagement of said input bevel gear with said first bevel gear of said first driving sleeve.

6. In a dual backlash compensator, for the drive mechanism of a movable member of a machine tool; a pair of axially aligned driving sleeves; a screw extending through said driving sleeves out of engagement therewith and connected to the movable member to effect movement of the member; a pair of nut elements rotatably engaged on said screw in spaced relationship to effect axial movement of said screw, one of said nut elements being connected to be rotatably driven by one of said driving sleeves, the other of said nut elements being connected to be rotatably driven by the other of said driving sleeves, the rotatable driving connection between one of said nut elements and its associated driving sleeve being such as to permit of axial adjustment of the said nut element relative to said screw; a bevel gear on each of said driving sleeves; a single input bevel gear in meshing engagement with said bevel gears of said sleeves; and an adjusting plug threadedly engaged in the said driving sleeve associated with said axially adjustable nut element and disposed in engagement with an end of the said axially adjustable nut element and operable when actuated to exert an axial force on said axially adjustable nut elements to move said nut element toward the first of said nut elements to thereby eliminate backlash between said nut elements and said screw, said adjusting plug being also operable to effect a slight rotation of said axially adjustable nut element to effect positive engagement of a gear tooth of said bevel gear associated with said nut element interdentally engaged with said input bevel gear and thereby effect rotation of said input bevel gear so that a tooth on said first bevel gear interdentally engaged with said input bevel gear is positively engaged with the opposite face of the interdental space of said input bevel gear; whereby backlash in the screw and nut mechanism is eliminated and lost motion in the drive connection between said gears is removed.

7. In an antifriction screw and nut actuating mechanism; a screw; a drive for said screw comprising, a first bevel gear; a second bevel gear, said first and second bevel gears being arranged in axial alignment about said screw but not in contact with it and maintained axially immovable; a first nut element engaged on said screw for rotation relative to it, said first nut element being connected to said first bevel gear for rotation therewith and in a manner to prevent axial movement of said first nut element is one direction; a second nut element engaged on said screw for rotation relative to it and for axial adjustment relative to it and toward said first nut element, said second nut element being disposed on said screw adjacent to said first nut element but spaced therefrom, said second nut element being connected to said second bevel gear for rotation with it but axially movable relative to it; a bevel input drive gear operably connected to rotate said first and second bevel gears simultaneously in the same direction; means operably connected to rotate said input gear in either direction; and an adjusting plug threadedly connected to said second bevel gear but not in contact with said screw and disposed in engagement with said second nut element to prevent axial movement of said second nut element in a direction opposite to the direction in which said first nut element is axially immovable, said adjusting plug being operable when actuated to effect axial movement of said second nut element on said screw toward said first nut element to thereby eliminate backlash between said screw and said nut elements, said adjusting plug being also operable to effect angular movement of said second nut element on said screw to thereby effect positive drive engagement between said second nut element and said second bevel gear, and said second bevel gear and said bevel input gear, and said bevel input gear and said first bevel gear, and said first bevel gear and said first nut element; whereby a single adjustment of said adjusting plug is operative to eliminate backlash in said screw and nut mechanism and lost motion in the drive connection to said nut elements.

8. In a backlash eliminator for a screw and nut mechanism and its associated drive; a screw; a first nut member in threaded engagement with said screw; a second nut member in threaded engagement with said screw; a first gear mounted on the periphery of said first nut member; a second gear mounted on the periphery of said second nut member adjacent to said first gear, said first and second gears functioning as a single gear whose teeth are split to form two annular portions; a third gear in meshing engagement with said first and second gears for simultaneouly rotating said first and second gears and their associated nut members; and adjusting means operative when actuated to force said first nut member in an axial movement relative to said second nut member for removing the backlash between said nut members and said screw, said adjusting means also functioning when actuated to revolve said first gear a limited amount relative to said second gear so that the teeth of said first gear are in engagement with one tooth of said third gear and the teeth of said second gear are in engagement with an adjacent tooth of said third gear to remove the backlash between said third gear and the single gear formed by said first and second gears.

9. In a backlash eliminator for a screw and nut mechanism and its associated drive; a screw; a split nut in threaded engagement with said screw; drive means operably connected to rotate said split nut; adjusting means operative when actuated to move one portion of said split nut axially relative to the other portion of said split nut for removing the backlash between said split nut and said screw, said adjusting means also functioning when actuated to remove the backlash in the driving connection between said drive means and said split nut; and locking means operable to lock said adjusting means in its actuated position so that the screw and nut mechanism may be operated with the backlash eliminator in effect.

10. In a backlash eliminator for a screw and nut mechanism and its associated drive; a screw; a first nut member in threaded engagement with said screw; a second nut member in threaded engagement with said screw; drive means operably connected to simultaneously rotate both of said nut members; and adjusting means operative when actuated to move said first nut member axially relative to said second nut member for removing the backlash between said nut members and said screw, said adjusting means also functioning when actuated to remove the backlash in the driving connection between said drive means and said nut members.

References Cited in the file of this patent

UNITED STATES PATENTS

| | | |
|---|---|---|
| 2,206,479 | Jereczk | July 2, 1940 |
| 2,320,353 | Ernst et al. | June 1, 1943 |
| 2,345,194 | Granberg et al. | Mar. 28, 1944 |
| 2,498,897 | Riedel | Feb. 28, 1950 |

FOREIGN PATENTS

| | | |
|---|---|---|
| 548,957 | Great Britain | Oct. 30, 1942 |
| 754,503 | Great Britain | Aug. 8, 1956 |
| 1,046,546 | France | Dec. 7, 1953 |